United States Patent
Strickland et al.

(10) Patent No.: US 7,966,663 B2
(45) Date of Patent: Jun. 21, 2011

(54) METHODS AND SYSTEMS FOR DETERMINING PRIVACY REQUIREMENTS FOR AN INFORMATION RESOURCE

(75) Inventors: Zoe Camilla Claire Strickland, Bella Vista, AR (US); Raymond J. Iandolo, Raleigh, NC (US); Kevin J. Ryan, Ben Lomond, CA (US); Harold E. Stark, Annapolis, MD (US); Deborah A. Kendall, Arlington, VA (US); Christopher J. Brannigan, Arlington, VA (US)

(73) Assignee: United States Postal Service, Washington, DC (US)

( * ) Notice: Subject to any disclaimer, the term of this patent is extended or adjusted under 35 U.S.C. 154(b) by 861 days.

(21) Appl. No.: 11/705,412

(22) Filed: Feb. 13, 2007

(65) Prior Publication Data

US 2008/0028435 A1    Jan. 31, 2008

Related U.S. Application Data

(63) Continuation of application No. 11/452,924, filed on Jun. 15, 2006, now abandoned, which is a continuation-in-part of application No. 10/850,292, filed on May 20, 2004.

(60) Provisional application No. 60/795,200, filed on Apr. 27, 2006, provisional application No. 60/471,970, filed on May 20, 2003.

(51) Int. Cl.
G06F 17/00 (2006.01)
G06F 17/30 (2006.01)

(52) U.S. Cl. ............................................. 726/26; 726/1

(58) Field of Classification Search .................... 726/26, 726/1; 713/193; 705/2
See application file for complete search history.

(56) References Cited

U.S. PATENT DOCUMENTS

| | | | |
|---|---|---|---|
| 5,621,887 A | | 4/1997 | Chatterji |
| 5,787,428 A | | 7/1998 | Hart |
| 5,826,268 A | | 10/1998 | Schaefer et al. |
| 6,105,027 A | | 8/2000 | Schneider et al. |
| 6,480,850 B1 | * | 11/2002 | Veldhuisen .................. 707/610 |
| 6,480,963 B1 | | 11/2002 | Tachibana et al. |
| 6,925,443 B1 | * | 8/2005 | Baggett et al. .................. 705/10 |
| 7,234,065 B2 | * | 6/2007 | Breslin et al. ................. 713/193 |
| 7,260,830 B2 | * | 8/2007 | Sugimoto ......................... 726/1 |
| 7,281,020 B2 | * | 10/2007 | Fine ..................................... 1/1 |
| 7,478,157 B2 | * | 1/2009 | Bohrer et al. ................. 709/226 |

(Continued)

FOREIGN PATENT DOCUMENTS

| WO | 2004/104788 A2 | 12/2004 |
|---|---|---|
| WO | 2004/104788 A3 | 3/2005 |

OTHER PUBLICATIONS

International Search Report mailed Jan. 4, 2005 in corresponding International Patent Application No. PCT/US2004/015870, 3 pages.

(Continued)

*Primary Examiner* — Eleni A Shiferaw
*Assistant Examiner* — Ali S Abyaneh
(74) *Attorney, Agent, or Firm* — Lewis and Roca LLP

(57) ABSTRACT

A privacy impact assessment is performed to determine and implement privacy requirements for any information resource that uses personal information. Data may be collected and analyzed regarding the information resource and the personal information, and applicable laws, regulations, and policies may be considered to determine privacy requirements. Such requirements may include, for example, access controls, information retention periods, systems requirements, and risk assessments.

40 Claims, 29 Drawing Sheets

U.S. PATENT DOCUMENTS

2003/0233438 A1  12/2003  Hutchinson et al.
2005/0132188 A1  6/2005  Khin et al.

OTHER PUBLICATIONS

International Preliminary Report on Patentability mailed Nov. 25, 2005 in corresponding International Patent Application No. PCT/US2004/015870, 7 pages.

Office Action mailed Mar. 28, 2008 in copending U.S. Appl. No. 10/850,292, filed May 20, 2004 entitled "Methods and Systems for Determining Privacy Requirements for an Information Resource" 24 pages.

Final Office Action mailed May 27, 2009 in copending U.S. Appl. No. 10/850,292, filed May 20, 2004 entitled "Methods and Systems for Determining Privacy Requirements for an Information Resource" 24 pages.

Office Action mailed Dec. 17, 2009 in copending U.S. Appl. No. 10/850,292, filed May 20, 2004 entitled "Methods and Systems for Determining Privacy Requirements for an Information Resource" 33 pages.

Final Office Action mailed Jun. 8, 2010 in copending U.S. Appl. No. 10/850,292, filed May 20, 2004 entitled "Methods and Systems for Determining Privacy Requirements for an Information Resource" 21 pages.

* cited by examiner

PROJECT IDENTIFICATION

| IDENTIFICATION | | | |
|---|---|---|---|
| INFORMATION RESOURCE NAME: | | | |
| ISA NUMBER: | | EIR NUMBER: | |
| CONTACT INFORMATION | | | |
| Functional Vice President: | | Other: | |
| Telephone Number: | | Telephone Number: | |
| Email Address: | | Email Address: | |
| Executive Sponsor: | | Executive Sponsor Designee: | |
| Telephone Number: | | Telephone Number: | |
| Email Address: | | Email Address: | |
| Portfolio/Business Mgr.: | | Portfolio/Business Mgr. Designee: | |
| Telephone Number: | | Telephone Number: | |
| Email Address: | | Email Address: | |
| Program Manager: | | Project Manager: | |
| Telephone Number: | | Telephone Number: | |
| Email Address: | | Email Address: | |
| ISSO: | | ISSR/DEVPOC: | |
| Telephone Number: | | Telephone Number: | |
| Email Address: | | Email Address: | |
| DEVELOPMENT AND PRODUCTION | | | |
| Development Organization: | | | |
| Development Site: | | | |
| Production Site(s): | | | |

*FIG. 4*

The Privacy Act of 1974

The Privacy Act of 1974 places restrictions on the collection, use, and dissemination of information relating to customers or employees that is maintained by an agency, including the USPS. The USPS must create and maintain a system of records for programs or systems where information is retrieved by customer or employee name or other identifier.

| 1. | | Does the program or system collect or store data related to a customer or employee where data is retrieved by name, unique number, symbol, or other identifier assigned to the customer or employee? | |
|---|---|---|---|
| ☐ | | No (If "No," skip to 2.2.) | |
| ☐ | | Yes (If "Yes," a Privacy Act system of records is required. Answer 1a – 1h.) | |
| | a) | Is this a new system of records? (See ASM and Privacy Office for assistance if a new system is needed or to modify an existing system.) | |
| | | ☐ | No |
| | | ☐ | Yes (If "Yes," contact Privacy Office) |
| | b) | Name the System of Records you will be using: (If you need further information, see Privacy Office.) | |
| | | | |
| | c) | When is the new or modified program or system expected to be operational? (mm/dd/yyyy) | |
| | | | |
| | d) | How long does the system indicate documents will be retained? (Explain process by which documents will be purged at the end of that time period.) | |
| | | | |
| | e) | If a customer or employee is asked to supply information, a Privacy Act notice is required (distinct from privacy policy on usps.com). The notice must provide the following: (All boxes must be checked or contact Privacy Office for assistance.) | |
| | | ☐ | The principal purpose(s) for which the information will be used. |
| | | ☐ | The authority which authorizes the collection of the information. |
| | | ☐ | Whether providing the information is voluntary, and the effects, if any, of not providing it. |
| | | ☐ | The routine uses (disclosures) which may be made of the information. |
| | f) | The Privacy Act Notice must be available at the time information is collected. (One or more boxes must be checked or contact Privacy Office.) | |
| | | ☐ | For Web sites, notice is provided in text where the information is collected, or can be accessed via link. |
| | | ☐ | For forms or other documents where data is collected, notice is on the document or form, and can be retained by the customer or employee. |

*FIG. 5*

| | | |
|---|---|---|
| | g) | Check all boxes that indicate how customers or employees may access data the USPS maintains on them, and how they may request a correction or amendment. (One or more boxes must be checked.) |
| | ☐ | With a link that leads to accessing information on the Web site. |
| | ☐ | By providing specific written instructions on how to gain access to and correct their information. |
| | ☐ | By providing a phone number of a USPS representative who will provide instructions. |
| | ☐ | Other: _____ |
| | h) | Steps must be taken to ensure the following: (Please check all the boxes below where steps have been or will be taken to ensure the following.) |
| | ☐ | Information is processed and maintained only for the purposes for which it was collected. |
| | ☐ | Information is reliable for its intended use. |
| | ☐ | Information is accurate. |
| | ☐ | Information is complete. |
| | ☐ | Information is current. |
| | | Please explain steps taken to ensure the above requirements are fulfilled. |

Gramm-Leach-Bliley Act

The USPS voluntarily complies with the Gramm-Leach-Bliley Act (GLB), Title V, which governs the treatment of personal information when certain financial services are provided. The GLB contains certain additional notice and choice requirements. Examples of financial services include banking activities or functions; wire or monetary transfers; printing, selling, or cashing checks; or providing USPS credit services. It does not include accepting payment by check or credit card issued by another entity.

| 2. | Does your program provide a financial service? |
|---|---|
| ☐ | No |
| ☐ | Yes (If "Yes," contact Privacy Office.) |

Children's Online Privacy Protection Act

The USPS voluntarily complies with the Children's Online Privacy Protection Act (COPPA), which requires notices and parental consent for certain practices if a website collects information from children under the age of 13.

| 3. | | If your program is online, do you know, or have reason to expect, that you are collecting personal information from children under the age of 13? |
|---|---|---|
| ☐ | | No |
| ☐ | | Yes (If "Yes," answer 3a.) |
| | a) | |
| | ☐ | Check that you have read and comply with the USPS privacy policy on usps.com related to collection of information from children, or contact Privacy Office. |

*FIG. 6*

Other Compliance

| | General |
|---|---|
| 4. | Are contractors or business partners employed regarding your system? |
| ☐ | No (If "No," skip to 5.) |
| ☐ | Yes (If "Yes," answer 4a- 4b.) |
| | a) Do contractors/partners have access to customer or employee information? |
| | ☐ No |
| | ☐ Yes |
| | b) Do contractors/partners help design, build, or operate an externally-facing web site? |
| | ☐ No |
| | ☐ Yes |
| | If "Yes" is checked in 4a or 4b above, list all prime contractors and partners, and contact Privacy Office to coordinate Law Department inclusion of appropriate privacy and confidentiality clauses in contract. <br><br> _____ _____ <br><br> _____ _____ |
| 5. | If you would like to use customer information for another purpose than why it was collected (e.g., market another USPS product), customers must have been given a choice regarding that use. Please check the box that applies: |
| ☐ | Will not use customer information for another purpose. |
| ☐ | Yes, with the choice to Opt-in for other uses (customers must perform some action to show permission). |
| ☐ | Other: _____ (Approval of the CPO is required.) |
| 6. | Is the system using technologies, different from usps.com (see Question 11), that have the capability to identify, locate, and monitor individuals? |
| ☐ | No |
| ☐ | If "Yes," specify: _____ (Contact Privacy Office.) |

*FIG. 7*

| | Online Applications | |
|---|---|---|
| 7. | Does your application operate on usps.com? | |
| ☐ | No (If "No," please state where your application resides.) | |
| ☐ | Yes | |
| 8. | Does your application require customers to register? | |
| ☐ | No | |
| ☐ | Yes | |
| 9. | Does your application use the usps.com registration process? | |
| ☐ | No (If "No," what registration process will your system use?) | |
| ☐ | Yes (If "Yes," skip to 11.) | |
| 10. | Will the registration process you use capture customer preference (as described in Question 5) on how the information is used? | |
| ☐ | Yes | |
| ☐ | No, other means will be used. (Approval of the CPO is required.) | |
| ☐ | No, the system will not be using the data collected for another purpose. | |
| 11. | Are any additional web analysis tools to be used beyond those used by usps.com? See usps.com privacy policy for authorized web analysis tools. For example, persistent cookies, web beacons, and other tools (except for session cookies) must be specifically authorized by the policy and CPO. | |
| ☐ | No | |
| ☐ | Yes (If "Yes," approval of the CPO is required.) | |
| 12. | Will the website include links to external sites of any sort? | |
| ☐ | No | |
| ☐ | Yes (If "Yes," check and comply with the box below or contact Privacy Office.)<br>☐ Links comply with the affiliate program's standards and usps.com privacy policy relating to banners and links. | |
| 13. | Will the website include ad banners of any sort? | |
| ☐ | No | |
| ☐ | Yes (If "Yes," check and comply with the box below or contact Privacy Office.)<br>☐ Banners comply with the usps.com standards and privacy policy relating to banners and links. | |

*FIG. 8*

Data Types

What type of data is being collected, or who does the data apply to? Please check all that apply.

| | |
|---|---|
| ☐ | Customer (external, non-vendor customer as defined by Section 2, *Privacy Compliance*) |
| ☐ | USPS Employee |
| ☐ | USPS Employment Applicant |
| ☐ | Contractor, Vendor, or Business Partner |
| ☐ | Other: |

Data Sources

Please check all the data sources that apply.

| DATA SOURCES | |
|---|---|
| ☐ | Customer (external, non-vendor customer) |
| ☐ | USPS Employee |
| ☐ | USPS Employment Applicant |
| ☐ | Contractor, Vendor, or Business Partner |
| ☐ | Other USPS Data Source or Business Entity |
| ☐ | Other Government Data Source |
| ☐ | Consumer Reporting Agency |
| ☐ | Law Enforcement Agency |
| ☐ | Other: |

Data Access

Please check all the individuals and organizations that will have access.

| DATA ACCESS | |
|---|---|
| ☐ | Customer (external, non-vendor customer) |
| ☐ | USPS Employees |
| ☐ | USPS Managers |
| ☐ | Contractor, Vendor, or Business Partner |
| ☐ | Other: |

*FIG. 9*

Data Element Sensitivity Designation

Check all the data elements that you are collecting, transmitting, using, retrieving, and/or storing. If you collect any data elements that are not listed below, contact the CPO for guidance on entering those data elements in the appropriate table below.

PERSONAL DATA

| Sensitive | | | |
|---|---|---|---|
| ☐ Full Social Security Number | ☐ Fingerprints | ☐ Biometric Data | ☐ USPS Personnel Records |
| ☐ USPS Applicant or Employee Medical Information | ☐ Information compiled for law enforcement purposes | ☐ Change of Address with court ordered non-disclosure | ☐ Other: |

| Business-Controlled Sensitivity | | | |
|---|---|---|---|
| ☐ Home Street Address* | ☐ Home Phone Number | ☐ Personal Cell Number* | ☐ Birth Date/Age* |
| ☐ Partial Social Security Number* | ☐ Driver's License Number | ☐ Credit Card Number (Full or Partial) | ☐ Race/National Origin* |
| ☐ Change of Home Address* | ☐ Other Account Number | ☐ Marital Status* | ☐ Family Information |
| ☐ Customer Obtained Demographic info.* | ☐ Externally Obtained Demographic Info.* | ☐ Buying Habits* | ☐ Web Navigation Habits* |
| ☐ Bill Payee Name | ☐ Bill Payee Address | ☐ Bill Payee Phone Number | ☐ Bill Payee Acct Number |
| ☐ Bank Routing Number | ☐ Bank Account Number | ☐ Personal Email Address | ☐ Personal Clubs and Affiliations* |
| ☐ Income/Assets: | ☐ Photographs | ☐ Other: | |

*Data element with a name or personal identifier is business-controlled sensitivity. Data element without a name or personal identifier is nonsensitive.

| Nonsensitive | | | |
|---|---|---|---|
| ☐ Name | ☐ City, State, and Zip (Home or Work) | ☐ Work Street Address | ☐ Work Phone Number |
| ☐ Work Fax Number | ☐ Work Cell Number | ☐ Work Pager Number | ☐ Work Email Address |
| ☐ Occupation | ☐ Job Description | ☐ USPS Salary | ☐ Professional Affiliations |
| ☐ ICQ/Chat Address | ☐ IP Address | ☐ Gender | ☐ USPS Employee ID Number |
| ☐ USPS Employee Title (position) | ☐ Other: | | |

*FIG. 10*

BUSINESS DATA

| Sensitive | | | |
|---|---|---|---|
| ☐ National Security Related Information | ☐ Communications Protected by Legal Privileges | ☐ USPS Restricted Financial/Trade Secrets/Proprietary | ☐ Other: |

| Business-Controlled Sensitivity | | |
|---|---|---|
| ☐ Not Publicly Available USPS Documents (withholdable under FOIA) | ☐ Not Publicly Available Information from Business Partners | ☐ Other |

| Non-Sensitive | | |
|---|---|---|
| ☐ Publicly Available USPS Information | ☐ Publicly Available Information from Business Partners | ☐ Other: |

Impact of Unauthorized Use

| 1. | Is the data subject to potential fraud or manipulation for financial gain? Check one. | |
|---|---|---|
| ☐ | Information has little or no potential to be used for financial gain through fraud or manipulation. | NS |
| ☐ | Information has moderate potential to be used for financial gain through fraud or manipulation. | BCS |
| ☐ | Information has significant potential to be used for financial gain through fraud or manipulation. | S |
| 2. | What is the impact on USPS of unauthorized disclosure or misuse of the information? Check one. (Includes revenue denied due to loss of business or market share, civil and legal penalties, impact to brand.) | |
| ☐ | Unauthorized disclosure or misuse of the information would result in little or no financial loss or negative impact to brand. | NS |
| ☐ | Unauthorized disclosure or misuse of the information would result in moderate financial loss or negative impact to brand. | BCS |
| ☐ | Unauthorized disclosure or misuse of the information would result in significant financial loss or negative impact to brand. | S |
| 3. | What is the impact on the individual on whom information is maintained if unauthorized disclosure or misuse of information occurs? Check one. | |
| ☐ | Results in little or no harm, embarrassment, inconvenience, or unfairness to the individual. | NS |
| ☐ | Results in moderate harm, embarrassment, inconvenience, or unfairness to the individual. | BCS |
| ☐ | Results in significant harm, embarrassment, inconvenience, or unfairness to the individual. | S |

Sensitivity Determination Summary

Based on an evaluation of the responses and the type of information being collected, this information resource is designated as (check one):

| ☐ Nonsensitive | ☐ Business-Controlled Sensitivity | ☐ Sensitive |
|---|---|---|

*FIG. 11*

Critical Impact of Information Resource Unavailability Determination

Check the box for each of the items below that best reflects the impact to the Postal Service if the information resource were to become unavailable.

| CUSTOMER OR EMPLOYEE WELL BEING (Life, safety, health, or financial status.) | | |
|---|---|---|
| ☐ | Little or no relationship to customer or employee well being. | NC |
| ☐ | Would result in moderate negative impact on the well being of customers or employees. | BCC |
| ☐ | Would result in a significant negative impact on the well being of customers or employees. | C |
| CUSTOMER OR MAIL SERVICE | | |
| ☐ | Little or no negative impact to customer or mail service. May result in inconvenience to customers but would not significantly impact customers or core business activities. | NC |
| ☐ | Would have a moderate negative impact on customers or impedes the movement of the mail. | BCC |
| ☐ | Would have a significant negative impact on customers or halts the movement of the mail. | C |
| PUBLIC CONFIDENCE, BRAND, OR IMAGE (Loss of customers, reduced competitiveness, or delay of new ventures and services.) | | |
| ☐ | Little or no relationship to public confidence, brand, or image. May result in a minimal or temporary impact on public confidence, brand, or image. | NC |
| ☐ | Would result in a moderate negative impact on public confidence, brand, or image. | BCC |
| ☐ | Would result in a significant negative impact on public confidence, brand, or image. | C |
| CASH FLOW (Outgoing cash such as accounts payable.) | | |
| ☐ | Little or no impact. May result in an inconvenience but would not significantly impact USPS financial activities related to outgoing cash (e.g., paying bills). | NC |
| ☐ | Would have a moderate negative impact on USPS financial activities related to outgoing cash. | BCC |
| ☐ | Would have a significant negative impact or prevent USPS financial activities related to outgoing cash. | C |
| REVENUE GENERATION (Incoming cash; e.g., accounts receivable, revenue denied due to loss of business or market share.) | | |
| ☐ | Little or no impact. May result in an inconvenience but would not significantly impact USPS financial activities related to incoming cash (e.g., receivables or loss of market share). | NC |
| ☐ | Would have a moderate negative impact on USPS financial activities related to incoming cash. | BCC |
| ☐ | Would have a significant negative impact or prevent USPS financial activities related to incoming cash. | C |

*FIG. 12*

| | | |
|---|---|---|
| ADDITIONAL EXPENSE RESULTING FROM CONDUCTING BUSINESS MANUALLY, OTHER LABOR-RELATED COSTS (Such as overtime, penalties, or legal liabilities.) | | |
| ☐ | Little or no additional expense or penalties. May result in additional costs, but significant additional expense and penalties would not be incurred. | NC |
| ☐ | Would result in moderate additional expenses, increased costs, or penalties. | BCC |
| ☐ | Would result in significant additional expenses, increased costs, or penalties. | C |
| FRAUD OR THEFT RESULTING FROM THE DIVERSION (OR CONCEALING) OF GOODS OR FUNDS BY INTERNAL OR EXTERNAL ENTITIES | | |
| ☐ | Little or no potential for fraud or diversion of goods. May result in a minor opportunity for fraud or diversion of goods. | NC |
| ☐ | Moderate potential for fraud or diversion of goods. | BCC |
| ☐ | Significant potential for fraud or diversion of goods. | C |
| AVAILABILITY DETERMINED BY REGULATORY REQUIREMENTS, CONTRACTUAL REQUIREMENTS, OR USPS STANDARDS | | |
| ☐ | Little or no impact on availability. Requirements or standards are either non-existent or subject to exemption. | NC |
| ☐ | Moderate impact on availability could violate requirements or standards. | BCC |
| ☐ | Significant impact on availability would violate requirements or standards. | C |
| AVAILABILITY AFFECTS REAL-TIME DECISION MAKING | | |
| ☐ | Little or no impact on real-time decision making. Information resource provides no or insignificant management and control information for real-time decision making. | NC |
| ☐ | Moderate impact could affect real-time decision making. | BCC |
| ☐ | Significant impact would affect real-time decision making. | C |
| PROVIDES REQUIRED INPUT OR REQUIRED SUPPORT FOR AN INFORMATION RESOURCE | | |
| ☐ | Provides no required input or required support to a critical or business-controlled criticality information resource or provides required input or required support for a noncritical information resource. | NC |
| ☐ | Provides required input or support for a business-controlled criticality information resource and there are no other alternatives available. | BCC |
| ☐ | Provides required input or support for a critical information resource and there are no other alternatives available. | C |

Criticality Determination Summary

Based on an evaluation of the responses, this information resource is designated as (check one):

| ☐ Noncritical | ☐ Business-Controlled Criticality | ☐ Critical |
|---|---|---|

Note: If the information resource is designated as critical or business-controlled criticality, continue with Section 6, *Determination of Recovery Time Objective (RTO)*. Otherwise, go directly to Section 7, *Acceptance of Responsibility and Acknowledgement of Accountability*.

*FIG. 13*

DETERMINATION OF RECOVERY TIME OBJECTIVE (RTO)

Completion of this section of the BIA is only required for information resources designated as critical or business-controlled criticality. This section provides a process for determining an appropriate recovery time objective (RTO) for an information resource. RTO is defined as the maximum length of time an information resource can be unavailable before the Postal Service begins to experience significant operational or business services losses.

| IMPACT DEFINITIONS | | |
|---|---|---|
| N | No or Negligible Impact | Has no or negligible impact on USPS operational or financial activities or the well being (life, safety, health, or financial status) of employees or customers. |
| M | Moderate Impact | Would have a moderate negative impact on USPS operational or financial activities or the well being of employees or customers. |
| H | High Impact | Would have a significant negative impact on USPS operational or financial activities or the well being of employees or customers. |

Identification of Impacts Over Time

To calculate the RTO for your information resource, use the legend above and do the following:

a) For each Impact Category, determine the degree of impact (N, M, or H) if the information resource were to become unavailable. Assume that the system becomes unavailable during your busiest processing cycle (e.g., end of quarter, holiday, etc.).
b) Enter N, M, or H for <u>each</u> category in <u>each</u> time interval column.

| Impact Categories | 1 Hr | 8 Hrs | 24 Hrs | 72 Hrs | 1 Week | 1 Month+ |
|---|---|---|---|---|---|---|
| Affects Public Confidence, Brand, Image (Loss of Customers or Competitiveness) | | | | | | |
| Affects the Well Being of Customers or Employees | | | | | | |
| Affects Cash Flow (Outgoing Cash such as Accounts Payable) | | | | | | |
| Affects Revenue Generation (Incoming Cash such as Accounts Receivable) | | | | | | |
| Results in Additional Expenses (such as overtime, penalties, liabilities, etc.) | | | | | | |
| Fraud or Theft Resulting from Unauthorized Use or Unavailability of the Information Resource | | | | | | | c) Total the number of "Moderates" and "Highs" from the above table and enter the totals in the table below.

| Impact Level Totals for | 1 Hr | 8 Hrs | 24 Hrs | 72 Hrs | 1 Week | 1 Month + |
|---|---|---|---|---|---|---|
| Moderate | | | | | | |
| High | | | | | | |

*FIG. 14*

Determine Internal or External Dependencies

In the table below, identify dependent information resources that provide input to or receive support from the information resource. A system is dependent if it CANNOT function without the input of the other system. Information resources that are dependent upon one another must have plans with recovery strategies based on the same RTO. (Continue the list on a separate page if necessary.)

Note: Go to the Enterprise Information Repository (EIR) at http://eir/ to identify the RTO for an information resource.

|   | Name of the Information Resource | External or Internal (E or I) | EIR Number | Provides Input to Info. Resource (Y or N) | Receives Support from the Info. Resource (Y or N) | RTO (If Known) | Criticality (C, BCC, or NC) |
|---|---|---|---|---|---|---|---|
| 1. | | | | | | | |
| 2. | | | | | | | |
| 3. | | | | | | | |
| 4. | | | | | | | |

Recovery Time Objective Calculation

Complete Steps 1 – 6, below, to determine RTO.

| Step | If you ... | Then ... | Time Interval |
|---|---|---|---|
| 1. | Recorded any High impacts in Section 6.1 | Enter the lowest time interval for recorded Highs in the *Time Interval* column (e.g., 1 hr., 8 hrs., etc.). | |
| | Did not record any Highs | Skip to step 2. | |
| 2. | Recorded any Moderates in Section 6.1 | Add up the number of Moderates in each time interval. Enter the time interval with the highest frequency of Moderates in the *Time Interval* column. <table><tr><td>If ...</td><td>Then ...</td></tr><tr><td>More than one time interval has the same frequency of Moderates</td><td>Enter the time in the *Time Interval* column that best matches your estimate of RTO</td></tr></table> | |
| 3. | Recorded no Highs or Moderates in any category | Enter one month in the *Time Interval* column. | |
| 4. | Recorded any dependencies and RTOs in Section 6.2 | Enter the lowest RTO time interval indicated in 6.2 in the *Time Interval* column. | |
| 5. | Recorded any time intervals in Steps 1, 2, and 4 | Enter the lowest of the time intervals in the *Time Interval* column. | Calculated RTO |
| 6. | Select the RTO your organization will use to design your recovery strategy | Record the Selected RTO in the *Time Interval* column and explain briefly under Comments why you selected a higher or lower RTO than the Calculated RTO in the space below (budget, risk avoidance, etc.). | Selected RTO |
| Comments: | | | |

*FIG. 15*

ACCEPTANCE OF RESPONSIBILITY AND ACKNOWLEDGEMENT OF ACCOUNTABILITY

I am responsible for implementing and funding security controls that will satisfy compliance with Information Security Assurance (ISA) outlined in Handbook AS-805, *Information Security*, and Handbook AS-805-A, *Information Security Assurance*. I understand this ISA compliance may affect the development time and cost of this project and must be planned for accordingly.

I will ensure that Postal Service information security policies, guidelines, and procedures are followed in system life cycle activities, including procurement, development, integration, and operation.

| COMMENTS: | | |
|---|---|---|
| | | |
| | | |
| | | |
| | | |
| Executive Sponsor or Designee | Title | Date (MM/DD/YYYY) |

*FIG. 16*

GENERAL INFORMATION RESOURCE DATA
Brief System Description

| | |
|---|---|
| Purpose: | |
| Applications: | |
| Operating System: | |
| Data or Database: | |
| Hardware: | |
| Network: | |
| Communications: | |
| Security Software: | |
| Other: | |
| Projected Production Date: | |

Development and Deployment Characteristics

| | Question | Yes | No |
|---|---|---|---|
| 1. | Will the information resource be publicly accessible? | | |
| 2. | Will the information resource be developed offsite primarily by non-Postal Service personnel? | | |
| 3. | Will the information resource be hosted at a non-Postal Service site? | | |
| 4. | Will the information resource be managed primarily by non-Postal Service personnel? | | |
| 5. | Will the information resource have high visibility or high impact if there is security incident? | | |
| 6. | Will the information resource be located in a Postal Service controlled access area? | | |
| 7. | Is a COTS product a significant feature or portion of the information resource? | | |
| 8. | Does the COTS product contain custom programming or scripts? | | |
| 9. | Is the information resource an externally-facing application containing custom programming (HTML, XML, Java, Javascript, CGI, ActiveX, etc.)? | | |
| 10. | Does the information resource transmit information between a Postal Service network and a public or other non-Postal Service network, or between a Postal Service demilitarized zone (DMZ) and a public network or non-Postal Service network? | | |
| 11. | Will the information be stored in a secure location? | | |
| 12. | If stored in a secure location, is access controlled? | | |

*FIG. 17a*

| 13. | Could unrestricted access to hardcopy information and storage media result in the disclosure of business-controlled sensitivity information? | | |
|---|---|---|---|
| 14. | Could the aggregation of multiple business-controlled sensitivity information elements by unauthorized persons result in the violation of an individual's privacy or jeopardize Postal Service operations? | | |
| 15. | Could unrestricted access to computer screens result in the disclosure of business-controlled sensitivity information? | | |
| 16. | Will access to this information increase the opportunity for theft, collusion, fraud, blackmail, or prevent the timely performance of Postal Service operations? | | |
| 17. | Is there an opportunity for disclosure, unavailability, modification or damage to the application, or prevention of timely performance of Postal Service operations if operational training is not provided? | | |
| 18. | Does application contain Active Content or CGI code? | | |
| 19. | Is the data collected, stored, analyzed, or maintained by this information resource available in another form or from another source? | | |
| 20. | Would the unavailability of this information resource prevent the timely performance of Postal Service operations? | | |

*FIG. 17b*

DECLARATION OF INFORMATION SECURITY REQUIREMENTS

Independent Processes

| Determination of the Need for Independent Processes | Yes | No |
|---|---|---|
| Has the VP CTO, Manager Corporate Information Security Office (CISO), or Vice-President of the functional business area designated the information resource as requiring an: | | |
| 1. Independent risk assessment? | | |
| 2. Independent code review? | | |
| 3. Independent validation of security testing? | | |
| 4. Independent penetration testing and vulnerability scans? | | |

*FIG. 18*

Information Security Requirements To Be Implemented

*LEGEND: BAS: Baseline, MAN: Mandatory, REC: Recommended Discretionary, ACC: Accepted Discretionary*

| REQ. NO. | INFORMATION SECURITY REQUIREMENT (HANDBOOK AS-805, INFORMATION SECURITY REFERENCE) | BAS | MAN | REC | ACC |
|---|---|---|---|---|---|
| 1-1 | Identify application, business requirements, and related roles and responsibilities (1-1) | X | | | |
| 3-4 | Label hardcopy and storage media as "restricted information" (3-5.1) | | | | |
| 3-5 | Add "restricted information" to computer screen display (3-5.1) | | | | |
| 3-7 | Implement appropriate disposal and destruction procedures (3-5.6); eradicate information on hardware and electronic media prior to re-use by another program or being released for maintenance (3-5.6.2, 3-5.5.4) | X | | | |
| 3-9 | Release information on clean, virus-free media (3-5.5.3) | X | | | |
| 4-1 | Complete an application risk assessment or an abbreviated application risk assessment (4-1, 4-4.1) | | | | |
| 4-2 | Conduct an independent risk assessment (4-5) | | | | |
| 4-3 | Complete a site security review (4-6.1) | | | | |
| 5-2 | Evaluate the use of cookies and other user tracking mechanisms (5-9.3.1, 5-9.3.2) | X | | | |
| 5-5 | Notify customers before transfer to an external site not under Postal Service control (5-9.3.3) | X | | | |
| 6-1 | Request clearance or background screening for applicable personnel (6-5) | | | | |
| 6-2 | Implement appropriate separation of duties and responsibilities (6-3.1) | | | | |
| 6-4 | Implement application operational security training (6-6.3) | | | | |
| 7-2 | Locate application in a controlled area (room level security) (7-3.1.1, 7-3.1.2) | | | | |
| 7-13 | Protect information resources being removed from a secure environment and sensitive and business-controlled sensitivity information residing on them (7-3.2) | | | | |
| 8-1 | Develop and maintain an application security plan or abbreviated application security plan (8-6.2.8) | | | | |
| 8-2 | Develop and execute a security test and evaluation [ST&E] plan (8-6.3.1, 8-6.3.6) | | | | |
| 8-4 | Provide high-level architectural diagrams (8-6.2.1); submit documentation for secure enclave assessment (11-5.8) | X | | | |
| 8-7 | Include information security in service level agreements [SLA] (internal and external systems) and trading partner agreements (external systems only) (8-6.2.14) | X | | | |
| 8-9 | Conduct independent validation of security testing (8-6.3.8) | | | | |
| 8-10 | Conduct independent security code review (8-6.3.5) | | | | |
| 8-11 | Conduct independent penetration tests and vulnerability scans (8-6.3.7) | | | | |

*FIG. 19*

| REQ. No. | INFORMATION SECURITY REQUIREMENT (HANDBOOK AS-805, INFORMATION SECURITY REFERENCE) | BAS | MAN | REC | ACC |
|---|---|---|---|---|---|
| 8-12 | Comply with Postal Service testing environment restriction policies (8-3.6) | X | | | |
| 8-15 | Conduct security code review (8-6.3.3) | | | | |
| 9-1 | Protect data from modification or deletion by unauthorized users (9-9.2) | X | | | |
| 9-2 | Uniquely identify and authenticate each user (9-6, 9-7); comply with authentication requirements established in Postal Service policies (9-7) | X | | | |
| 9-3 | Restrict supervisory and administrative privileges (9-5.3.2) | X | | | |
| 9-4 | Implement session management including timeouts or screen savers where the platform permits (9-7.9) | X | | | |
| 9-6 | Implement logical access security (9-11) | | | | |
| 9-7 | Authorize access based on need-to-know and least privilege (9-4.1.2, 9-4.1.4) | X | | | |
| 9-8 | Encrypt appropriate information transmitted over untrusted networks (9-8.2.1, 3-5.4.1) based on Postal Service encryption and key recovery policies (9-8.2, 5-6.3) | | | | |
| 9-9 | Encrypt information stored in a non-secure location (9-8.2.2, 3-5.4.2) based on Postal Service encryption and key recovery policies (9-8.2, 5-6.3) | | | | |
| 9-10 | Encrypt information stored in a secure location (onsite and offsite) (9-8.2.2, 3-5.4.2) based on Postal Service encryption and key recovery policies (9-8.2, 5-6.3) | | | | |
| 9-12 | Implement application level auditing and logging (9-12) | | | | |
| 10-1 | Implement virus protection (10-7) | X | | | |
| 10-3 | Implement application on a server hardened to Postal Service standards (10-5.3.1) | X | | | |
| 10-5 | Evaluate Active content or CGI code (10-7.2.2) | | | | |
| 10-7 | Implement appropriate database security (10-6.6.2) | X | | | |
| 11-6 | Acquire approval in advance for modem access to and from Postal Service networks and implement information resource protection measures in accordance with Postal Service remote access security policies (11-12.3) | X | | | |
| 12-1 | Develop and test an application disaster recovery plan [ADRP] (12-7.1, 12-9) | | | | |
| 12-4 | Implement backup and recovery procedures (12-5) | X | | | |
| 12-5 | Implement off-site storage of backup media or off-site backups (12-5.5) | | | | |
| 12-6 | Utilize secondary storage device (network attached storage, RAID storage); implement redundancy (redundant components, servers, infrastructures); implement fault-tolerant systems; implement a mirrored site (12-7.3); and maintain an inventory of backup media offsite (12-5.4) | | | | |
| 13-1 | Report incidents in accordance with Postal Service policies (13-4.1) | X | | | |
| 14-1 | Implement authorized warning banner (14-5.5) | X | | | |

FIG. 20

2-1 SYSTEM OF RECORDS – Data Management

The Privacy Act of 1974 and USPS policy provide privacy protections for employee or customer information that the USPS or its supplier maintains in a 'system of records.' A system of records (SOR) is a file or application from which employee or customer information is retrieved by an identifier. In those cases, data must be managed in accordance with comprehensive data practices, such as how data is collected, managed, and disclosed, that apply to that SOR. Each SOR has been published in the Federal Register, and is reprinted in USPS Handbook AS-353, *Guide to Privacy and the Freedom of Information Act.* (See HBK AS-353, 3-3.)

| | |
|---|---|
| a. | Does the program or application collect or store information related to a customer or employee where data is retrieved by name, unique number, symbol, or other identifier assigned to the customer or employee? |
| ☐ | No (skip to 2-6.) |
| ☐ | Yes (Privacy Act system of records (SOR) is required.) |
| b. | Does an existing Privacy Act system of records (SOR) apply? |
| ☐ | No (skip to 'e' and contact Privacy Office to develop new SOR.) |
| ☐ | Yes (provide name of SOR): _____ (For assistance, contact Privacy Office.) |
| c. | Does the existing SOR need to be modified? |
| ☐ | No |
| ☐ | Yes (skip to 'e' and contact Privacy Office.) |
| d. | Have you read, and will the application comply with, all data management practices in the SOR? |
| ☐ | No |
| ☐ | Yes |
| e. | When is the application expected to be operational? |
| | (mm/dd/yyyy) |
| f. | What is the data retention period for the application? |
| | (specify): |
| | What is the process for purging records at the end of that period? |
| | (specify): |
| g. | Will the application meet all of the following? (Check all applicable boxes.) |
| ☐ | Information is processed and maintained only for the purposes for which it was collected. |
| ☐ | Information is reliable for its intended use. |
| ☐ | Information is accurate. |
| ☐ | Information is complete. |
| ☐ | Information is current. |
| h. | Will the application collect only the minimum information required for functional operation? |
| ☐ | No |
| ☐ | Yes |

*FIG. 22*

2-2 NOTICE

The Privacy Act of 1974 and USPS policy requires a privacy notice to be provided to the customer or employee when information is collected directly from them. A privacy notice describes the purpose of collection and data protections that apply to the information. (See HBK AS-353, 3-2.)

| a. | Is information collected from a customer or employee that can be used to identify them? |
|---|---|
| ☐ | No (skip to 2-3.) |
| ☐ | Yes (privacy notice is required.) |
| b. | Check all sources from which information will be collected. |
| ☐ | Employees (including applicants) |
| ☐ | Individual customers |
| ☐ | Business customers |
| c. | Check all channels/methods that will be used to collect information. |
| | ☐ In-person  ☐ verbal  ☐ hard-copy form  ☐ telephone  ☐ fax  ☐ e-mail  ☐ online |
| d. | If information is collected online from a customer (either individual or business), is there a link to the usps.com privacy policy on each page of the application? |
| ☐ | Not applicable, as information will not be collected online from individual or business customers. |
| ☐ | No |
| ☐ | Yes |
| e. | If information is collected online from an employee, how is a privacy notice provided? |
| ☐ | Not applicable, as information will not be collected online from employees. |
| ☐ | Notice is available on the screen near where data is collected. |
| ☐ | Via link |
| ☐ | Other (specify): |
| f. | If information is collected from an individual customer other than from usps.com, or from an employee by any channel, does the privacy notice include the following elements? (Check all applicable boxes.) |
| ☐ | Not applicable, as information will not be so collected. |
| ☐ | 1. Proximity and Timing: the notice is provided at the time and point of data collection. |
| ☐ | 2. Purpose: describes the principal purpose(s) for which the information will be used. |
| ☐ | 3. Authority: specifies the legal authority that allows the information to be collected. |
| ☐ | 4. Conditions: specifies if providing information is voluntary, and effects, if any, of not providing it. |
| ☐ | 5. Disclosures: specifies routine use(s) that may be made of the information. |
| g. | If information is collected from a business customer by fax, email, form, or mail, how is a privacy notice provided? |
| ☐ | Not applicable, as information will not be so collected. |
| ☐ | Via statement on the document, e.g., "See our privacy policy on usps.com." or "For information regarding our privacy policies visit us at usps.com." |
| ☐ | Other (specify): |

*FIG. 23*

2-3 CHOICE

The Privacy Act and USPS policy require that information collected about customers and employees can only be used for the purpose(s) for which it was collected, unless consent is granted for a secondary use. Customers must be given a choice as to whether their information may be used for a secondary marketing use, such as to up-sell or cross-sell to the customer, or to share the customer's information with third parties for marketing purposes. Answer 'a' through 'c' if the application collects or manages customer information; answer 'd' if it collects or manages employee information. (See HBK AS-353, 3-2.3.)

| a. | Do you intend to use customer information for a secondary use? |
|---|---|
| ☐ | No (skip to 2-4.) |
| ☐ | Yes |
| b. | If information is collected from an individual customer, they must provide express consent for any secondary use of their information (opt-in). How will the application provide a mechanism for opt-in? |
| ☐ | Not applicable, as information will not be collected from individual customers. |
| ☐ | Application will use usps.com registration. |
| ☐ | Application will use other method (explain): |
|   |   |
| c. | If information is collected from a business customer, they must take an affirmative step to prevent any secondary use of their information (opt-out). How will the application provide a mechanism for opt-out? |
| ☐ | Not applicable, as information will not be collected from business customers. |
| ☐ | Application will use usps.com registration. |
| ☐ | Application will use other method (explain): |
| d. | Do you intend to use employee information for a secondary use? |
| ☐ | No |
| ☐ | Yes (contact Privacy Office to determine if amendment to applicable Privacy Act SOR is needed). |

*FIG. 24*

2-4 ACCESS

Under the Privacy Act and USPS policy, customers or employees may access (and request corrections to) information regarding themselves that the Postal Service maintains in an SOR. (See HBK AS-353, 3-4.)

| a. | How does the application provide customers or employees with instructions for accessing or amending data related to them that is maintained by the USPS? (Check all applicable boxes.) |
|---|---|
| ☐ | The application will provide a link that leads to their information. |
| ☐ | The application will provide, via link or where data is collected, written instructions on how to access/amend their information. |
| ☐ | The application will provide a phone number of a USPS representative who will provide instructions. |
| ☐ | The application will use other method (explain): |
| | |

*FIG. 25*

2-5 REDRESS – Customer Systems

Under USPS policy, customers may submit questions and inquiries regarding USPS privacy policies, and a process must be in place for responding in a timely manner. (See HBK AS-353, 3-4.3.)

| a. | How does the application enable customers to submit questions or inquiries about USPS privacy policies or use of their data? |
|---|---|
| ☐ | Not applicable, as information will not be collected from customers. |
| ☐ | The application will provide a link or reference to usps.com privacy policy. |
| ☐ | The application will use other method (explain): |

*FIG. 26*

2-6  SUPPLIERS

Under the Privacy Act and USPS policy, suppliers and business partners that have access to customer or employee information, or that help to build or operate a customer website, must adhere to USPS privacy policies. (See HBK AS-353, 3-8.)

| a. | Are contractors or business partners employed regarding the application? |
|---|---|
| ☐ | No (skip to 2-7.) |
| ☐ | Yes |
| b. | Do contractors/partners have access to customer or employee information? |
| ☐ | No |
| ☐ | Yes |
| c. | Do contractors/partners help design, build, or operate a customer-facing web site? |
| ☐ | No |
| ☐ | Yes |
| d. | If yes was checked for 'b' or 'c' above, list all contractors and partners below, and contact Privacy Office or Law Department to coordinate with Supply Management to ensure inclusion of appropriate privacy and confidentiality clauses in contract. |
|  |  |
|  |  |
|  |  |
|  |  |
|  |  |
|  |  |
|  |  |

*FIG. 27*

2-7 ONLINE AND OTHER TECHNOLOGIES - Customer Systems

Under the E-Government Act and USPS policy, the USPS has established policies for the use of technology, including web analysis tools such as cookies and web beacons, which can track customer behavior. The policies limit the types of tools allowed, types of data collected, and duration of tool activation. (See HBK AS-353, 3-6.)

| a. | Does the application collect any information relating to customer behavior? |
|---|---|
| ☐ | No (skip to 2-8.) |
| ☐ | Yes (describe): |
| b. | What channel(s) does the application use? (Check all applicable boxes.) |
| ☐ | The application operates entirely on blue.usps.gov. (skip to 2-8.) |
| ☐ | Offline only (skip to 'g.') |
| ☐ | Online only |
| ☐ | Both Offline and Online |
| c. | Does the application operate on usps.com? |
| ☐ | No (provide url): |
| ☐ | Yes (provide url on usps.com): |
| d. | If online, will the application use web analysis tools in any way that exceeds the limits of the usps.com privacy policy? See the usps.com privacy policy for authorized uses of web analysis tools. For example, persistent cookies, web beacons, and other tools (except for session cookies) must be specifically authorized by the policy and CPO. |
| ☐ | No |
| ☐ | Yes (describe): |
| e. | Will the application include links to any type of external site(s)? |
| ☐ | No |
| ☐ | Yes |
| ☐ | If yes, check box if links comply with the usps.com privacy policy relating to links. |
| f. | Will the application include any type of ad banners? |
| ☐ | No |
| ☐ | Yes |
| ☐ | If yes, check box if banners comply with usps.com privacy policy relating to banners. |
| g. | If offline, will the application use any technology to identify or track customers? |
| ☐ | No |
| ☐ | Yes (explain): |

*FIG. 28*

2-10 PRIVACY RISKS

In accordance with the Privacy Act, the E-Government Act, and USPS policy, the USPS identifies, analyzes, and mitigates privacy risks for systems that collect or maintain information related to customers or employees. (See HBK AS-353, 2-2.)

| a. | Does the application collect or maintain information related to customers or employees, involve a customer web site, or use technology that can track customer behavior? |
|---|---|
| ☐ | No (skip to section 3.) |
| ☐ | Yes |
| b. | Have you considered or has the application been reviewed for any possible privacy risks or impacts? |
| | |
| ☐ | No (skip to section 3.) |
| ☐ | Yes |
| c. | Has the review identified any privacy risks and/or impacts related to the application? |
| ☐ | No (skip to section 3.) |
| ☐ | Yes (describe): |
| | |
| d. | Have efforts been made to mitigate privacy risks and/or impacts related to the application? |
| ☐ | No |
| ☐ | Yes (describe): |
| | |

*FIG. 29*

METHODS AND SYSTEMS FOR DETERMINING PRIVACY REQUIREMENTS FOR AN INFORMATION RESOURCE

RELATED APPLICATIONS

This is a continuation of U.S. patent application Ser. No. 11/452,924, filed Jun. 15, 2006, which is a continuation-in-part of U.S. patent application Ser. No. 10/850,292, filed May 20, 2004, both of which are incorporated herein by reference. Under provisions of 35 U.S.C. §119(e), this Application claims the benefit of U.S. Provisional Application No. 60/471,970, filed May 20, 2003, and U.S. Provisional Application No. 60/795,200, filed Apr. 27, 2006, both of which are incorporated herein by reference.

BACKGROUND

I. Technical Field

The present invention generally relates to determining and facilitating compliance with privacy requirements of an information resource. More particularly, the present invention relates to determining and ensuring compliance with privacy requirements for an information resource by considering security requirements, sensitivity concerns, and applicable statutory, regulatory, and/or policy requirements for management of personal information maintained within an information resource.

II. Background Information

In today's economy, sensitive personal information is constantly being collected, transmitted, and stored by public and private sector organizations. Electronic transactions routinely transmit personal data, such as name, address, and account numbers over public networks for use and storage in organizations' databases. More detailed data related to the electronic transactions may also be collected, such as what a person purchases or how much time was spent at a website. Many conventional retailers, such as grocery stores and drug stores, use loyalty/discount cards that record a customer's brand preferences and specific purchases, including prescriptions, etc. Identification cards with embedded electronic transponders that ease lines at security gates, tollbooths, or public transportation may be used to track when and where a person travels. Local and national government agencies, health care entities, and educational institutions are legally required to securely collect and manage a broad range of highly sensitive personal information.

With the ever-increasing use of databases, data mining, electronic commerce, e-government, and the Internet, privacy concerns have become paramount. Unwanted marketing, inappropriate surveillance, and identity theft are potential results of mishandled personal data. Therefore, public and private sector organizations must vigilantly protect such data from misuse. Numerous laws and regulations, including the Privacy Act of 1974 and the Children's Online Privacy Protection Act, have been enacted to specify detailed requirements for how, when, and by whom specific types of personal data may be collected, stored, and used. Privacy policies have become commonplace on websites and companies, and are required at government websites. Privacy officers now work at the highest levels of organizations to promulgate and implement privacy protections.

One such institution is the United States Postal Service (USPS), an independent government agency required to provide mail delivery and other services to every person and organization in the US. The USPS is widely recognized as a safe and reliable means for sending and receiving all types of personal and business mail. With the advent and steady growth of electronic mail and electronic commerce, the physical mail stream will increasingly be utilized for securely sending and receiving essential correspondence, as well as packages and other items. The USPS collects, processes, transports and delivers billions of items each year. The agency also provides a number of related electronic services through its website, usps.com, which features 25 thousand web pages and receives over 1 million visits per month. To serve its millions of customers, the USPS is authorized and required to collect a vast amount of information, including home addresses, credit card numbers, change of address data, etc. Even more information is handled but scrupulously not collected or stored, such as the magazines a person orders or where a person's mail comes from. It is fundamental to its role as a trusted public servant that the USPS protect the information entrusted to it, and manage that information in diligent compliance with all applicable privacy statutes and regulations.

For agencies such as the USPS, governmental entities, and private companies alike, determining privacy requirements and implementing privacy policies remains a significant challenge. Furthermore, various privacy laws and regulations separately apply to individual types of organizations, with some laws covering only federal agencies (e.g., Privacy Act) and other laws controlling only private firms in a particular industry (e.g., Gramm-Leach Bliley Act in the financial service industry). Effective systems for managing large amounts of sensitive information while ensuring compliance with the applicable requirements are an operational necessity. As a government-controlled corporation, the USPS is required to comply with a combination of public and private sector privacy laws and regulations. As a corporation with over $60 billion in annual sales, more than 700,000 employees, and over 250,000,000 customers, the USPS also needs to implement corporate privacy policies in many circumstances. Accordingly, it is desirable to provide methods and systems for determining applicable privacy requirements and facilitating their implementation.

SUMMARY

Consistent with embodiments of the present invention, systems and methods are disclosed for determining privacy requirements for an information resource.

In one embodiment, privacy requirements are determined by identifying an information resource that uses personal information about an individual and collecting data about the information resource. The data about the information resource includes data about privacy aspects of the information resource, data about a privacy notice related to the information resource, data about choice available to the individual, data about the individual's access to the personal information, data about redress available to the individual, data about third party access to the information resource, and data about information tools used by the information resource. A privacy risk is analyzed based on the collected data, and a privacy requirement is determined based on the collected data and the privacy risk.

In another embodiment, privacy requirements for an information resource are determined by collecting data about the information resource and collecting data about information used by the information resource. A rule is identified based on the data about the information resource and the data about the information used by the information resource, and a privacy requirement for the information resource is determined by applying the rule.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 through FIG. 20 illustrate exemplary data entry forms consistent with an embodiment of the present invention;

FIG. 22 through FIG. 29 illustrate exemplary data entry forms consistent with an embodiment of the present invention.

DETAILED DESCRIPTION

Figure 1:
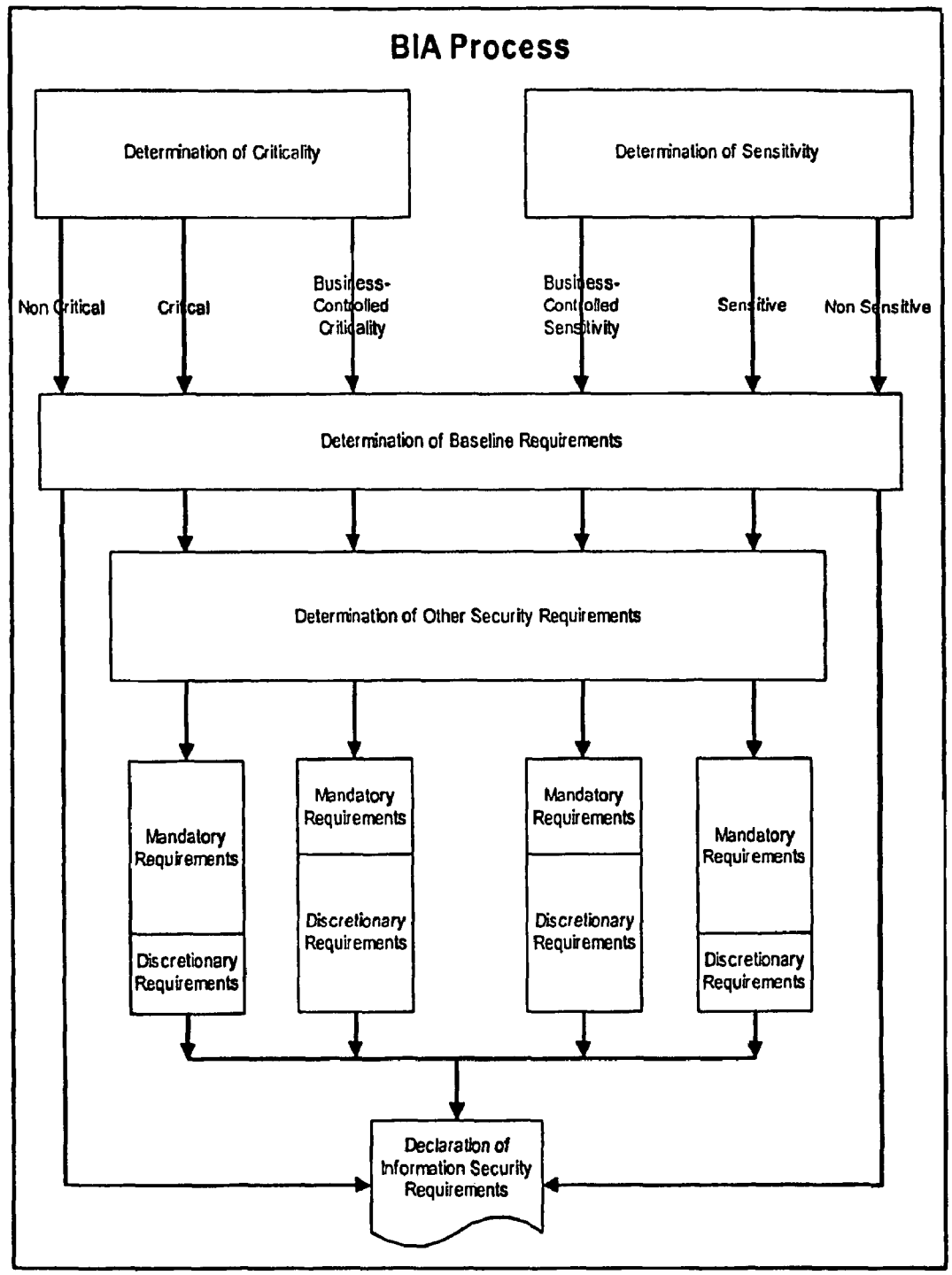
FIG. 1 is a block diagram of a system for determining privacy requirements by determining security requirements for an information resource consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

I. Business Impact Assessment

Systems and methods consistent with embodiments of the present invention may determine privacy requirements for data used by an information resource, such as a database or website, associated with an enterprise such as, for example, a corporation, a government agency, or the USPS. FIG. 1 shows an exemplary system for determining privacy requirements that may include performing a business impact assessment (BIA). Performing the BIA may include collecting information about the information resource and identifying privacy requirements, a sensitivity level, a criticality level, and a recovery time objective. Based on these determinations, security requirements may be automatically generated to protect the information resource and enforce the privacy requirements. The BIA may encompass multiple business processes or focus on one particular aspect of the enterprise. Also, the BIA may be completed for all information resources, regardless of whether they are developed in-house, out-sourced, or hosted in non-enterprise related facilities.

Privacy requirements may be identified from a number of different sources, including laws and regulations, company policies, ethics rules, etc. These privacy requirements may be mandatory, as with laws, or they may be adopted voluntarily, as with privacy policies developed by an organization's privacy officer and approved by the organization's senior management. For an example of a legal requirement, the Privacy Act of 1974 restricts the collection, use, and dissemination of information relating to customers or employees maintained by a federal agency. In another example, a company's privacy policy may establish a requirement that the company will voluntarily extend compliance with the privacy requirements for collecting information online from minors set forth in the Children's Online Privacy Protection Act to include both online and offline collection of such information. The privacy requirements determined to apply to information stored in or collected by an information resource may contribute to determining the sensitivity level and the resulting security requirements.

The aforementioned sensitivity level may indicate the need to protect the confidentiality and integrity of information. As shown in FIG. 1, the sensitivity levels may include, but are not limited to, sensitive, business-controlled sensitivity, and non-sensitive. The sensitivity level of a piece of information may be determined, for example, by the legal privacy requirements associated with the information, by the corporate privacy policy requirements associated with the information or by corporate policies based upon the consideration of the impact of potential unauthorized access or use.

Moreover, the aforementioned criticality level may indicate the need for continuous availability and integrity of the information. As shown in FIG. 1, the criticality levels may include, but are not limited to, critical, business-controlled criticality, and non-critical. The criticality level may be based upon the potential impact if an information resource were to become unavailable. For example, considerations may include whether customer service would suffer, whether a significant loss of brand image would occur, or whether cash flow would be impacted.

Moreover, the BIA may determine the information security requirements for information resources. The security requirements associated with an information resource's protection may be categorized, for example, as baseline, mandatory, discretionary, and discretionary treated as mandatory. The security requirements may vary with the information resource's privacy requirements, sensitivity and criticality designation, and the responses to data received from a user.

Baseline security requirements may be requirements implemented by an enterprise's information resources to protect the enterprise's infrastructure. Security requirements may include, for example, independent review of code changes, virus protection, warning messages, encryption, etc. For example, these requirements may be noted with an "X" in a box in the baseline (BAS) column of the data entry forms shown in FIGS. 19-20, as described below. Furthermore, mandatory security requirements may be requirements implemented based on the privacy requirements and sensitivity and criticality designation of the enterprise's information resources. For example, these requirements may be noted with an "X" in a box in the mandatory (MAN) column of the data entry forms of FIGS. 19-20, as described below. Discretionary security requirements, for example, may be marked with an "X" in a box in the accepted discretionary (ACC) column in FIGS. 19-20, also as described below.

In some instances, there are security requirements that may have been treated as discretionary, but, for example, based on responses to selected questions shown in the forms of FIGS. 17a and 17b (general information resource data) and FIG. 18 (declaration of security requirements), these security requirements may be treated as mandatory. In this way, security requirements may be automatically generated based on privacy requirements, criticality level, etc. When any of these questions are answered "Yes", the requirement may be noted with an "X" in the MAN column in FIGS. 19-20. Additional security requirements may be required due to changes in technology, changes in the enterprise's mission, or the discovery of new vulnerabilities in applications and infrastructure during an information resource risk assessment process.

For non-sensitive and non-critical information resources, for example, appropriate controls may be implemented to satisfy the baseline security requirements. For sensitive, business-controlled sensitivity, critical, and business-controlled criticality information resources, for example, the appropriate controls may be implemented to satisfy the baseline security requirements, the mandatory security requirements, and discretionary security requirements. The BIA may be performed whenever a new information resource is being developed and may be updated periodically (every three years or whenever a significant change is made to the information resource, for example.)

BIA process benefits may include: i) a structured and cost effective methodology that yields consistent and repeatable results; ii) clear, succinct guidelines to ensure privacy compliance at an appropriate phase of the business planning process; iii) determination of appropriate information resource sensitivity and criticality designation; iv) determination of information resource dependencies and an appropriate recovery time objective (RTO); v) the focusing of security requirements on information resource privacy requirements, sensitivity, criticality, function, and environment; vi) a risk-based approach that empowers business owners to implement controls to satisfy the discretionary requirements where the business risk justifies such practices; and vii) early determination of security requirements that can be integrated into plans, costs, design, development, and testing of information resources.

An embodiment consistent with the invention may comprise a system for ensuring compliance with privacy requirements for an information resource. The system may comprise a memory storage for maintaining a database and a processing unit coupled to the memory storage. The processing unit may be operative to determine privacy requirements and, further, the processing unit may be operative to determine a sensitivity level associated with the information resource. Furthermore, the processing unit may be operative to determine a criticality level associated with the information resource. In addition, the processing unit may be operative to determine the security requirements for the information resource based on at least one of the sensitivity level and the criticality level. Moreover, the processing unit may be operative to determine a recovery time objective for the information resource and to insure that information used in determining the security requirements adheres to the privacy requirements.

Figure 2:
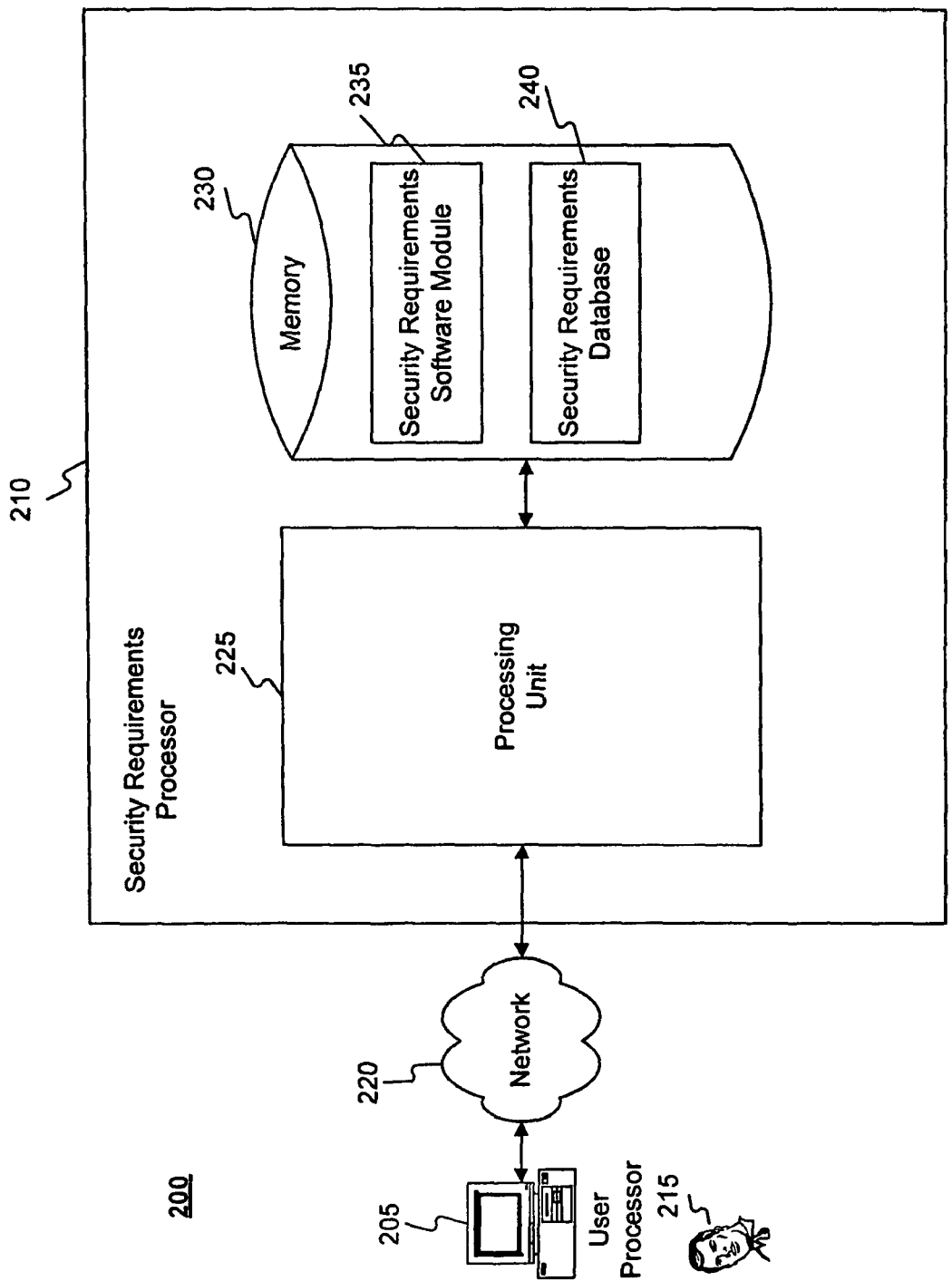
FIG. 2 is a block diagram of a security requirements system consistent with an embodiment of the present invention.

Consistent with an embodiment of the present invention, the aforementioned memory, processing unit, and other components may be implemented in a security requirements system, such as an exemplary security requirements system 200 of FIG. 2. In security requirements system 200, security requirements for an information resource may be automatically generated based on privacy requirements that inform a sensitivity level and/or a criticality level of the information resource. Any suitable combination of hardware, software and/or firmware may be used to implement the memory, processing unit, or other components. By way of example, the memory, processing unit, or other components may be implemented with any of a user processor 205 or security requirements processor 210, in combination in system 200. The aforementioned system and processors are exemplary and other systems and processors may comprise the aforementioned memory, processing unit, or other components, consistent with embodiments of the present invention.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

By way of a non-limiting example, FIG. 2 illustrates system 200 in which the features and principles of the present invention may be implemented. As illustrated in the block diagram of FIG. 2, system 200 may include user processor 205, security requirements processor 210, a user 215, and a network 220. User 215 may be an individual, for example, desiring to determine security requirements to ensure compliance with privacy requirements for an information resource using user processor 205. User 215 may also be an organization, enterprise, or any other entity having such desires.

Security requirements processor 210 may include a processing unit 225 and a memory 230. Memory 230 may include a security requirements software module 235 and a security requirements database 240. For example, security requirements software module 235, executed on processing unit 225, may access security requirements database 240 and implement processes for determining security requirements for the information resource such as the exemplary method described below with respect to FIG. 3. Security requirements processor 210 may use privacy requirements associated with an information resource to determine the security requirements necessary to ensure compliance with the privacy requirements.

User processor 205 or security requirements processor 210 ("the processors") included in system 200 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 220 may comprise, for example, a local area network (LAN) or a wide area network (WAN). Such networking environments are commonplace in offices, enterprise-wide computer networks, intranets, and the Internet, and are known by those skilled in the art. When a LAN is used as network 220, a network interface located at any of the processors may be used to interconnect any of the processors. When network 220 is implemented in a WAN networking environment, such as the Internet, the processors may typically include an internal or external modem (not shown) or other means for establishing communications over the WAN. Further, in utilizing network 220, data sent over network 220 may be encrypted to insure data security by using known encryption/decryption techniques.

In addition to utilizing a wire line communications system as network 220, a wireless communications system, or a combination of wire line and wireless may be utilized as network 220 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 200 may also transmit data by methods and processes other than, or in combination with, network 220. These methods and processes may include, but are not limited to, transferring data via, diskette, CD ROM, facsimile, flash memory sticks, conventional mail, an interactive voice response system (IVR), or via voice over a publicly switched telephone network.

Figure 3:
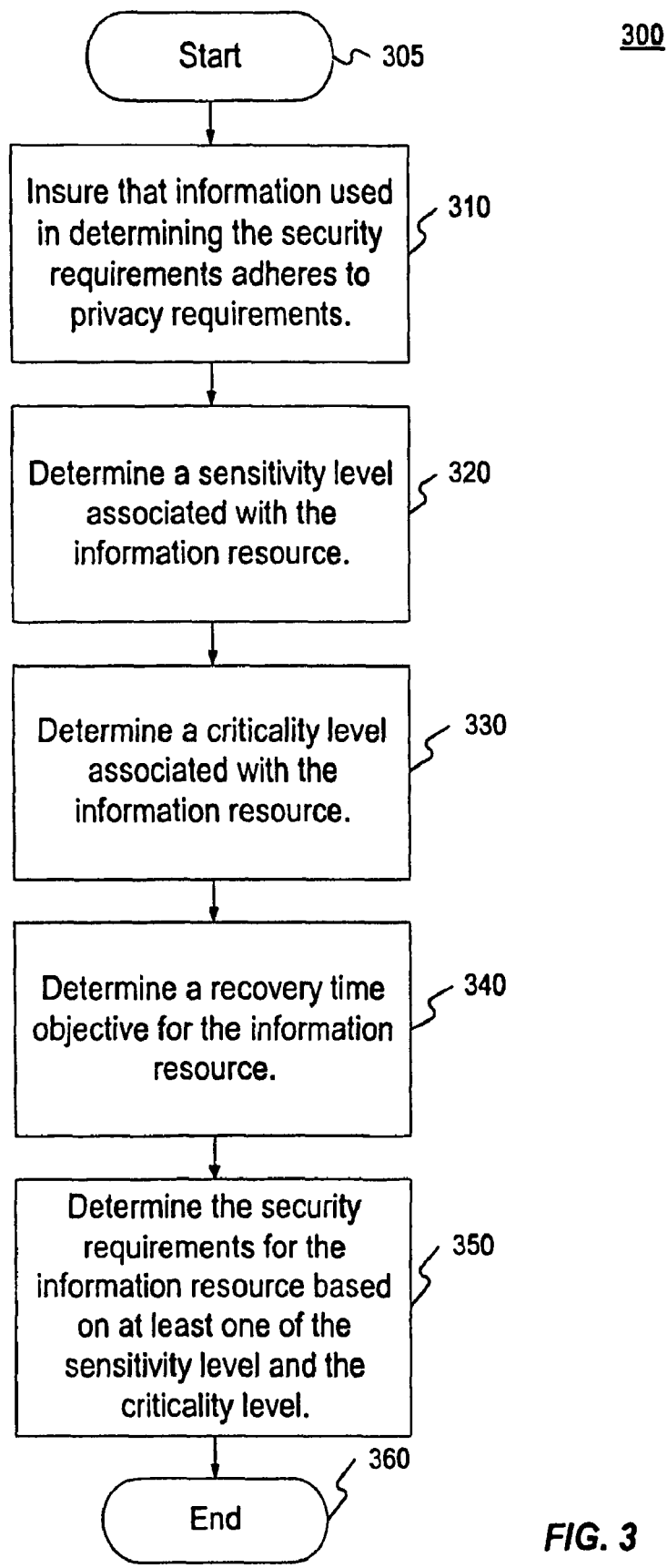
FIG. 3 is a flow chart of an exemplary method for implementing privacy requirements consistent with an embodiment of the present invention.

FIG. 3 is a flow chart setting forth the general stages involved in an exemplary method 300 consistent with the invention for determining privacy requirements for an information resource using system 200 of FIG. 2. Exemplary ways to implement the stages of exemplary method 300 will be described in greater detail below. Exemplary method 300 may begin at starting block 305 and proceed to stage 310 where processor 210 may insure that information used in determining the security requirements adheres to privacy requirements. For example, user 215 may enter data into processor 210 over network 220. Processor 210 may present screens to user 215, viewing user processor 205, in which user 215 may enter data. The screens may include a project identification screen as shown in FIG. 4, which receives entry of project Identification information, contact information, and development and production information. Furthermore, system 200 may receive from user 215 data regarding privacy data in screens shown in FIG. 5 through FIG. 9. Based on data entered in FIG. 5 through FIG. 9, for example, processor 210 may insure that information used in determining the security requirements adheres to privacy requirements.

To evaluate privacy requirements, system 200 may prompt user 215 to provide input about an information resource such as the type of information collected (e.g., name, social security number, etc.), the type of services provided by a program (e.g., banking or financial services), the ages of individuals (e.g., children under 13 years old), etc. This input may be driven in part by requirements of privacy laws, corporate policies, etc. Depending on the input received, system 200 may seek additional input regarding privacy considerations, such as the use of privacy notices, data retention policies, and who has access to the information resource.

From stage 310, where processor 210 insures that the information used in determining the security requirements adheres to privacy requirements, exemplary method 300 may advance to stage 320 where processor 210 may determine a sensitivity level associated with the information resource. For example, processor 210 may receive data from user 215 over network 220. Processor 210 may present screens to user 215, viewing user processor 205, in which user 215 may enter data. The screens may include sensitivity data screens as shown in FIG. 10 and FIG. 11. For example, if one or more of the items in FIG. 10 and FIG. 11 are designated by user 215 to be sensitive, processor 210 may determine a sensitivity level of "sensitive" and may indicate as much by marking the corresponding box at the bottom of FIG. 11. If none of the items in FIG. 10 and FIG. 11 are designated by user 215 to be sensitive, but one or more are designated as business-controlled sensitivity, processor 210 may determine a sensitivity level of "business-controlled sensitivity" and may indicate as much by marking the corresponding box at the bottom of FIG. 11. Furthermore, if all of the items in FIG. 10 and FIG. 11 are designated by user 215 to be non-sensitive, processor 210 may determine a sensitivity level of "non-sensitive" and may indicate as much by marking the corresponding box at the bottom of FIG. 11. All of the privacy-related data collected by system 200 may be used to accurately determine the sensitivity level and resulting security requirements for an information resource.

Once processor 210 determines the sensitivity level associated with the information resource in stage 320, exemplary method 300 may continue to stage 330 where processor 210 may determine a criticality level associated with the information resource. For example, user 215 may enter data into processor 210 over network 220. Processor 210 may present screens to user 215, viewing user processor 205, in which user 215 may enter data. The screens may include criticality data screens as shown in FIG. 12 and FIG. 13. For example, if one or more of the items in FIG. 12 and FIG. 13 are designated by user 215 to be critical, processor 210 may determine a criticality level of "critical" and may indicate as much by marking the corresponding box at the bottom of FIG. 13. If none of the items in FIG. 12 and FIG. 13 are designated by user 215 to be critical, but one or more are designated as business-controlled criticality, processor 210 may determine a criticality level of "business-controlled criticality" and may indicate as much by marking the corresponding box at the bottom of FIG. 13. Furthermore, if all of the items in FIG. 12 and FIG. 13 are designated by user 215 to be non-critical, processor 210 may determine a criticality level of "non-critical" and may indicate as much by marking the corresponding box at the bottom of FIG. 13. All of the privacy-related data collected by system 200 may be used to accurately determine the sensitivity level and resulting security requirements for an information resource.

After processor 210 determines a criticality level associated with the information resource in stage 330, exemplary method 300 may proceed to stage 340 where processor 210 may determine a recovery time objective for the information resource. For example, user 215 may enter data into processor 210 over network 220. Processor 210 may present screens to user 215, viewing user processor 205, in which user 215 may enter data. The screens may include recovery time objective (RTO) data screens as shown in FIG. 14 and FIG. 15. User 215 may enter data in identification of impacts over time section of FIG. 14 by determining the impacts associated with the various time intervals for each impact category. These values may be used to determine the recovery time objective. In each box, user 215 may enter an "N," "M," or "H" to reflect the impact to the enterprise (Negligible, Moderate, or High) if the information resources were to be unavailable for each of the indicated time intervals using the impact definitions provided. For any information resource with a time to impact greater than 1 week, user 215 may mark the "1-month+" column. Furthermore, processor 210 may complete the identification of impacts over time section (c) by tallying the "M" and "H" responses recorded in section (b) and noting the count in the appropriate time interval.

Next, user 215 may complete the determine internal and external dependencies section of FIG. 15 by entering the dependent information resources that provide required support to, or receive required support from, the information source. Dependent information resources may be ones that cannot function without support of another. Information resources that are dependent on input support from another resource may have plans with recovery strategies based on the same RTO. If not, an executive sponsor may negotiate changing the RTO of the information resource(s) providing or receiving support as appropriate. User 215 may also complete the recovery time objective calculation section of FIG. 15 by following steps 1 through 6 shown in this section of FIG. 15.

From stage 340, where processor 210 determines the recovery time objective for the information resource, exemplary method 300 may advance to stage 350 where processor 210 may determine the security requirements for the information resource to ensure compliance with privacy requirements based. On, for example, the sensitivity level and the criticality level. For example, for information resources with a "non-sensitive" sensitivity level and a "non-critical" criticality level, appropriate controls may be implemented to satisfy the baseline security requirements. For information resources with a "sensitive" or a "business-controlled sensitivity" sensitivity level and a "critical" or "business-controlled criticality" criticality level, the appropriate controls may be implemented to satisfy the baseline security requirements, the mandatory security requirements, and discretionary security requirements.

User 215 may complete an acceptance of responsibility and acknowledgement of accountability screen as shown in FIG. 16 and a general information resource data screen as shown in FIG. 17*a* and FIG. 17*b*. The responses to the FIG. 17*a* and FIG. 17*b* questions may be used to determine security requirements and whether independent processes (risk assessment, code review, validation of security testing, penetration testing, and vulnerability scans) may be recommended.

Next, user 215 may complete a declaration of information security requirements screen as shown in FIG. 18 by checking the appropriate boxes relative to the need for independent processes. Independent processes may be evaluations conducted by independent personnel, contractors, or vendors for the purpose of applying rigorous evaluation standards to information resources. An independent process may be conducted by an internal or external organization that is separate and distinct from those responsible for the development and operation of the application and strictly adheres to the separation of duties policy.

User 215 may then complete information security requirements to be implemented screens as shown in FIG. 19 through FIG. 20. The baseline security requirements for all information resources may be pre-marked in the BAS column by processor 210. The mandatory and recommended discretionary security requirements may be marked in the MAN and REC columns respectively. A portfolio manager or designee may decide which of the recommended discretionary security requirements will be implemented and may indicate acceptance by placing an X in the appropriate box in the ACC column.

For example, processor 210 may determine that the security requirements, based on a non-sensitive sensitivity level and a non-critical criticality level, must implement controls that will satisfy the baseline security requirements and any mandatory security requirements identified in: i) question 9 of FIG. 17*a* (development and deployment characteristics) or in ii) FIG. 18 (independent processes.) Furthermore, processor 210 may determine that the security requirements, based on business-controlled, sensitive and critical information resources, must implement controls that will satisfy the baseline security requirements, the mandatory security requirements, and the accepted discretionary security requirements. Once processor 210 determines the security requirements for the information resource based on at least one of the sensitivity level and the criticality level in stage 350, exemplary method 300 may then end at stage 360.

II. Privacy Impact Assessment

Figure 21:
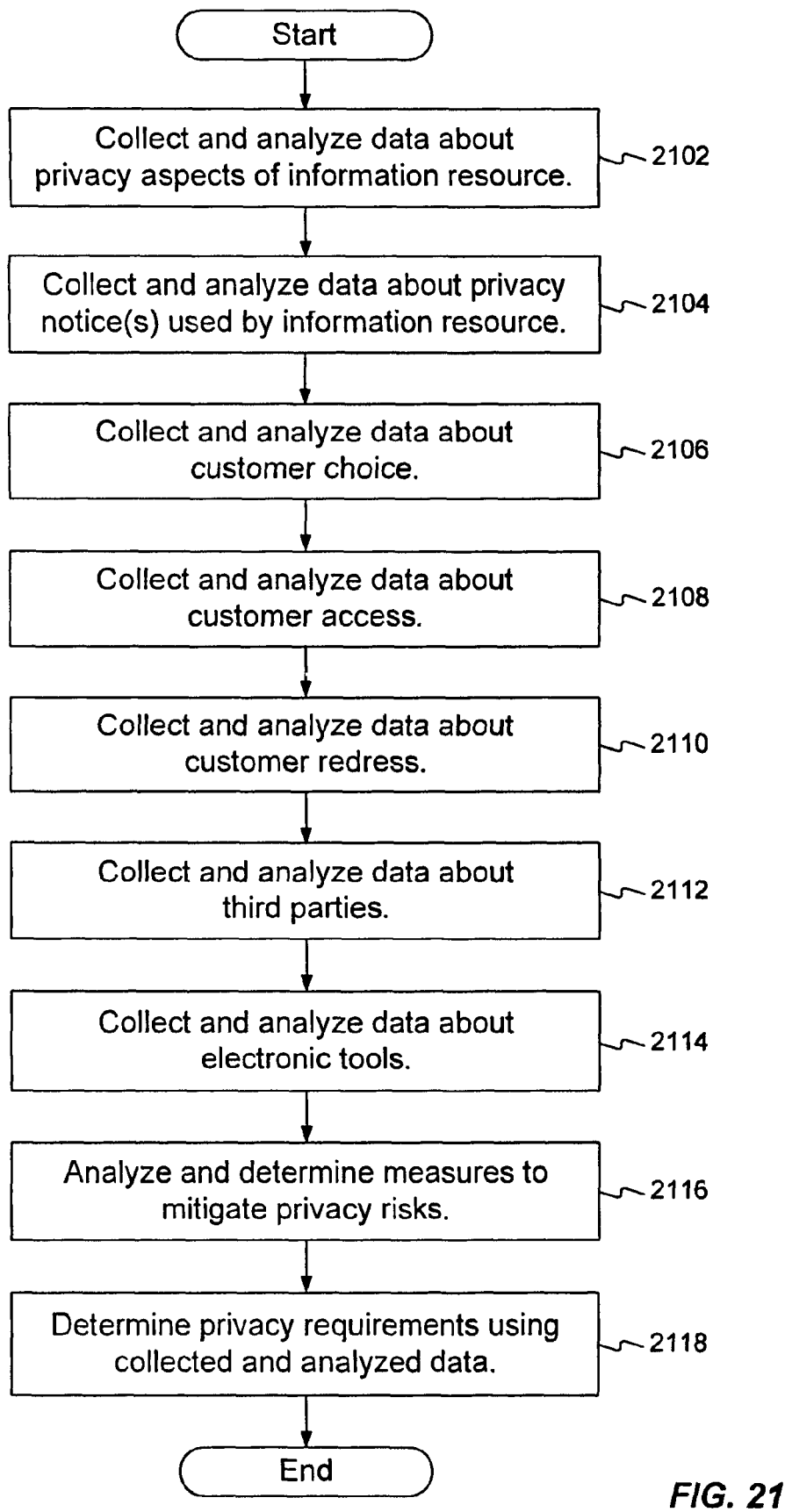
FIG. 21 is a flow chart of an exemplary method for determining privacy requirements for an information resource consistent with an embodiment of the present invention.

FIG. 21 is a flow diagram of a method for performing a privacy impact assessment using system 200 consistent with an embodiment of the present invention. A privacy impact assessment may be performed to determine and implement privacy requirements for any information resource that contains personal information. In certain embodiments, a privacy impact assessment (PIA) for an information resource may be conducted using a series of user interfaces to collect and analyze data regarding the information resource. The collected data may be used to determine privacy requirements for the information resource and to implement the applicable privacy requirements.

FIG. 21 shows a process for collecting data as part of a PIA that may be performed, for example, by processor 210. In step 2102, data about the information resource is collected. This data may be collected using, for example, a graphical user interface as shown in FIG. 22. A user may be prompted to enter data that can be used to determine what, if any, privacy requirements may be required for the information resource. For example, in one embodiment, an information resource may be described as a system of records (SOR) that maintains personal information. For example, a SOR may be any type of file or application from which personal information may be retrieved using an identifier, such as a person's name, customer number, etc. The user may be prompted to enter data regarding whether the information resource meets the definition of an SOR and, if so, whether an existing SOR privacy system is in place or needs to be modified. Other data may also be collected, such as any existing privacy requirements (e.g., data retention period, data management practices) of the information resource.

In step 2104, the user may also be prompted to enter data about privacy notice practices related to the information resource. The graphical user interface shown in FIG. 23 is one example of a tool for collecting information such as whether identifying information is collected in the information resource, from whom information is collected, how information is collected, and whether a privacy notice is used as part of the information collection.

Systems consistent with the present invention can provide immediate assistance to a user completing a PIA. For example, some privacy requirements may be implemented by including them in the user interface. As shown in FIG. 23, when a user is asked whether identifying information is collected, the answer "Yes" may be accompanied by instructions such as "privacy notice is required." Guidance for completing the PIA may also be provided by the interface. For example, when a user answers "No" to the question, the instructions "skip to 2-3" may be included together with the "No" answer to indicate to the user that they can skip to another interface, saving the user time and preventing possible mis-entry of PIA data. Still further, interfaces consistent with the present invention may provide information to assist a user in understanding privacy requirements. For example, in addition to asking whether a privacy notice is used, the interface of FIG. 23 educates the user about different aspects of a privacy notice, such as proximity and timing, purpose, authority, conditions, and disclosures.

In step 2106, data may be collected about the choice provided to the person (e.g., customer, employee, etc.) about whom information is collected/used/disclosed by the information resource. The graphical user interface shown in FIG. 24 may be used to prompt a user to input information about whether information will be used for a secondary purpose (e.g., up-selling, cross-selling, marketing, etc.) and, if so, whether the individual is asked to provide consent for that use (opt-in) or given the option to prohibit that use (opt-out).

Again, the system can help guide the user through the PIA process, e.g., by noting that the user can skip to the next interface if the information is not intended to be used for a secondary use. The interface may be customized to educate the user about a company's policies, e.g., question 2-3b informs the user that if information is collected from an individual customer, the individual must provide express consent for a secondary use. In this way, the education and data collection performed in a PIA can help enforce a company's policies. Consistent with the present invention, a PIA can determine and implement privacy requirements for a variety of different types of individuals. For example, different privacy requirements may apply to information collected about individual customers, business customers, and employees.

In step 2108, data may be collected about the access provided to the person about whom information is collected. For example, a company's policy may dictate that any personal information collected or stored must be made available to that person. A user interface such as that shown in FIG. 25 may be used to determine whether and how a person will, be provided with such access.

In step 2110, data may be collected about a person's avenues for redress regarding information collected by an information resource. For example, a company's policy may dictate that a procedure must be established for receiving, processing, and responding to inquiries regarding privacy protections. The user interface shown in FIG. 26 may be used to collect data about how these protections are implemented in an information resource.

In step 2112, a user may provide data about third parties having access to an information resource containing personal or identifying information. For example, a graphical user interface as shown in FIG. 27 may be used to determine whether suppliers or business partners are involved in the development of an information resource or have access to the information resource. This interface may be used to gather information about each of the third parties involved to enable further investigation and education regarding privacy requirements that the third parties must follow.

In step 2114, a user may provide data about the use of electronic tools and other technologies in an information resource. For example, a government agency may have restrictions on the use of web tools such as cookies and web beacons, which can track customer behavior. The user interface shown in FIG. 28 may be used to collect and analyze information such as whether and how customer behavior information is collected, whether web analysis tools are used, what external sites may be linked to the resource, and what type of advertising or customer tracking may be used.

In step 2116, privacy risks may be analyzed using data collected using an interface such as that shown in FIG. 29. The user may be prompted to enter data about potential uses of collected information and instructed to identify potential privacy risks. Based on the identified risks, the user may be instructed about possible mitigation tools or prompted to enter data about risk analyses already conducted.

The user interfaces shown in FIGS. 22-29 are user-friendly, dynamic tools for automatically collecting and analyzing information as part of a PIA. For example, in some of the interfaces, if a user selects "No" to a certain question, the rest of the information on the interface may not need to be collected. For example, on FIG. 23, if a user indicates that "No," information is not collected that can be used to identify a customer or employee, then the user does not need to provide any other input about privacy notices. Thus, a system consistent with the present invention may automatically detect the user's input, determine that the user needs to input no other information on that user interface, and present the next interface. Such automatic analysis guides a user through the PIA process, saving the user time and reducing the chance of erroneous data entry.

One skilled in the art will appreciate that the user interfaces shown in FIGS. 22-29 are exemplary only and that any number of different types of data may be collected and analyzed using such interfaces. For example, the questions and directions included in the interfaces may be customized to reflect a company's individual technical requirements (e.g., prohibitions on the use of cookies), privacy requirements (e.g., no collection of social security numbers), industry regulations (e.g., securities reporting requirements), or business philosophy (e.g., no permissible secondary uses of personal information).

Finally, in step 2116, the data that has been collected and analyzed regarding the information resource is used to determine privacy requirements for the information resource. Such privacy requirements may include, for example, access controls, information retention periods, systems requirements, and risk assessments, as discussed below in further detail.

A. Access Control

Privacy requirements identified as applicable to a particular piece of personal or identifying information stored in an information resource may contribute to determining access control requirements for the information resource. Access control requirements may dictate, for example, how a piece of information may be stored within the information resource or how that piece of information may be used, shared, or transmitted both within the organization and externally to other entities.

Statutes, regulations, and company policies may all be considered when determining access control requirements. For example, the Privacy Act requires that government agencies publish a record of the types of approved disclosures for various types of personal information. The information in such a record may include, e.g. for what purposes, under what conditions, and with which organizations data may be shared.

In another example, personal data sharing by commercial financial service firms is subject to the Graham Leach Bliley Act which requires corporations holding personal data collected from customers to publish their access control/data sharing practices in annual notices mailed to customers, specifically providing each customer with the opportunity to decline to have their personal information shared outside the collecting firm for marketing purposes.

Consent, known as "opt-in" or "opt-out," may be provided to the customer as determined by applicable legal requirements and company policies. "Opt-in" requires the customer to take positive action to confirm their permission for the sharing of their data before the company may legally do so. "Opt-out" provides the company with default permission for data sharing that may be revoked by the customer choosing to "opt-out."

For a company to comply with access control privacy requirements in such a system, sometimes called "permission marketing," a PIA tool may determine that the company must maintain records of a customer's stated choice together with his personal information.

B. Retention Periods

Another privacy requirement that may be identified in a PIA is a data retention requirement for information within an information resource. For example, the Privacy Act requires government agencies to provide prior notice through Federal Register publication of a Privacy Act System of Record (SOR) including any applicable data retention period for each different type of personal information collected and maintained by the resource that is subject to the Privacy Act. Thus, the PIA tool may inform the user that this notice is required based on analyzing data collected using the process of FIG. 21. Because the determination of the actual retention period is left to the discretion of the agency, the PIA tool may be customized based on, for example, company policy or user request. For example, data may be retained about an employee from the date of application to one year after the date of termination.

In some instances, published data retention periods become legally binding on an agency, making compliance important. Furthermore, individual data pieces may be associated with different data retention periods, e.g., based on the date of collection, that extend for a set period of time from that date, or for a set period of time after an initial date stated in the SOR. This exemplifies how the present invention can flexibly manage privacy requirements for an entire information resource, individual data stored within the resource, etc.

C. Systems Requirements

Privacy requirements that apply to a particular type of information may indicate the need to ensure compliance with legal requirements that may or may not be directly related to information security. For example, the Privacy Act requires government agencies to provide prior notice that collected information is subject to all applicable Privacy Act protections at the location of data collection to the person from whom the information is being collected. System requirements such as this apply not just to individual pieces of data but to whole categories of data.

Other such protections include Federal Register publication by the agency of the Privacy Act System of Record (SOR) including all associated information on the data management practices of the system, including who will have access to the data, where and how long the data will be held, and how to contact the SOR manager for access and redress related to the collected information. Compliance with the Privacy Act requirements for SOR publication and for providing notice prior to collection of information must typically be ensured by an agency before any collection of personal information may take place. Using data collected in the process of FIG. 21, the PIA tool may identify resources when such compliance is required or preferred.

D. Risk Assessments

Privacy risk assessment may be used to identify privacy requirements applicable to a particular piece of information or to an information resource. The results of the privacy risk assessment may contribute to determining privacy requirements and possibly modifying security requirements both within the information resource and within the organization.

Before any information is collected, privacy risk assessments may be conducted to identify potential risks related to the effects of collecting, maintaining and disseminating personal information in an information resource, and to the evaluate and/or implement additional protections and alternative processes for handling information to mitigate potential privacy risks. The privacy risk assessment may contribute to determining privacy and security requirements, and to reducing them by promoting alternative approaches that may meet organizational objectives with reduced risks.

For example, a BIA privacy risk assessment that identifies risks associated with collecting and maintaining Social Security Numbers may be part of a system review process that determines that it is not absolutely essential to the stated system objective for social security numbers to be collected. Therefore, a less sensitive identifier may be selected for collection and maintenance within the information resource and the information resource's privacy and security requirements may be revised.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

We claim:

1. A method utilizing a computer system for determining and facilitating compliance with privacy requirements of an information resource that uses personal information about an individual, comprising:
   identifying the information resource that uses personal information about the individual;
   collecting data relating to privacy issues about the information resource, including at least four of:
      data about privacy aspects of the information resource,
      data about a privacy notice related to the information resource,
      data about choice available to the individual,
      data about the individual's access to the personal information,
      data about redress available to the individual,
      data about third party access to the information resource, and
      data about information tools used by the information resource;
   storing the data related to privacy issues collected about the information resource in a database in the computer system;
   analyzing a privacy risk based on the collected data related to privacy issues for the information resource; and determining a privacy requirement for the information resource based on the collected data and the privacy risk utilizing a processor in the computer system.

2. The method of claim 1, wherein the privacy requirement applies to the personal information used by the information resource.

3. The method of claim 1, wherein the privacy requirement applies to the information resource.

4. The method of claim 1, wherein the personal information includes at least one of a name, an address, a social security number, and an identifying number.

5. The method of claim 1, wherein the information resource collects the personal information.

6. The method of claim 1, wherein the information resource stores the personal information.

7. The method of claim 1, wherein the information resource transmits the personal information.

8. The method of claim 1, wherein the determining further comprises: applying a rule to the collected data.

9. The method of claim 8, wherein the rule is one of a law, a regulation, and a privacy act.

10. A method for determining and facilitating compliance with privacy requirements for an information resource utilizing a computer system, comprising:
  collecting data concerning privacy issues about the information resource, including at least four of:
    data about privacy aspects of the information resource,
    data about a privacy notice related to the information resource,
    data about choice available to the individual,
    data about the individual's access to the personal information,
    data about redress available to the individual,
    data about third party access to the information resource, and
    data about information tools used by the information resource;
  storing the data concerning privacy issues collected about the information resource in a database in the computer system;
  collecting data about information used by the information resource;
  storing the data about the information used by the information resource in the database in the computer system;
  identifying a rule based on the data concerning privacy issues collected about the information resource and the data about the information used by the information resource;
  and
  applying the rule to determine a privacy requirement for the information resource utilizing a processor in the computer system.

11. The method of claim 10, wherein the rule is one of a law, a regulation, and a privacy policy.

12. The method of claim 10, wherein the privacy requirement relates to controlling access to the information resource.

13. The method of claim 10, wherein the privacy requirement relates to retention of the information used by the information resource.

14. The method of claim 10, wherein the privacy requirement relates to systems requirements of the information resource.

15. The method of claim 10, wherein the privacy requirement relates to a privacy risk associated with the information resource.

16. The method of claim 10, wherein the information resource is one of a website, an application, and a database.

17. The method of claim 10, wherein the information is personal information about an individual.

18. The method of claim 10, wherein the information is identifying information about an individual.

19. The method of claim 10, wherein collecting data about the information resource further comprises:
  displaying a user interface on a display device with at least one question about the information resource to a user; and
  receiving the data about the information resource from the user via the displayed user interface.

20. The method of claim 10, wherein collecting data about information used by the information resource further comprises:
  displaying a user interface on a display device with at least one question about the information used by the information resource; and
  receiving the data about the information used by the information resource from the user via the displayed user interface.

21. A computer implemented system for determining and facilitating compliance with privacy requirements of an information resource that uses personal information about individuals, comprising:
  a computer memory;
  an identifying component configured to identify the information resource that uses personal information about an individual;
  a collecting component configured to collect data relating to privacy issues about the information resource, including at least four of:
    data about privacy aspects of the information resource,
    data about a privacy notice related to the information resource,
    data about choice available to the individual,
    data about the individual's access to the personal information,
    data about redress available to the individual,
    data about third party access to the information resource, and
    data about information tools used by the information resource;
  a storage component configured to store the data related to privacy issues collected about the information resource in a database;
  an analyzing component configured to analyze a privacy risk based on the collected data related to privacy issues for the information resource; and
  a determining component configured to determine a privacy requirement for the information resource based on the collected data and the privacy risk.

22. The system of claim 21, wherein the privacy requirement applies to the personal information used by the information resource.

23. The system of claim 21, wherein the privacy requirement applies to the information resource.

24. The system of claim 21, wherein the personal information includes at least one of a name, an address, a social security number, and an identifying number.

25. The system of claim 21, wherein the information resource collects the personal information.

26. The system of claim 21, wherein the information resource stores the personal information.

27. The system of claim 21, wherein the information resource transmits the personal information.

28. The system of system 21, wherein the determining component further comprises:

an applying component configured to apply a rule to the collected data.

29. The system of claim 28, wherein the rule is one of a law, a regulation, and a privacy act.

30. A computer implemented system for determining and facilitating compliance with privacy requirements for an information resource of an information resource that uses personal information about individuals, comprising:
- a computer memory;
- a first collecting component configured to collect data concerning privacy issues about the information resource, including at least four of:
  - data about privacy aspects of the information resource,
  - data about a privacy notice related to the information resource,
  - data about choice available to the individual,
  - data about the individual's access to the personal information,
  - data about redress available to the individual,
  - data about third party access to the information resource, and
  - data about information tools used by the information resource;
- a second collecting component configured to collect data about information used by the information resource;
- an identifying component configured to identify a rule based on the data concerning privacy issues collected about the information resource and the data about the information used by the information resource;
- a storing component configured to store the information used by the information resource in a database; and
- an applying component configured to apply the rule to determine a privacy requirement for the information resource.

31. The system of claim 30, wherein the rule is one of a law, a regulation, and a privacy policy.

32. The system of claim 30, wherein the privacy requirement controls access to the information resource.

33. The system of claim 30, wherein the privacy requirement affects retention of the information used by the information resource.

34. The system of claim 30, wherein the privacy requirement affects systems requirements of the information resource.

35. The system of claim 30, wherein the privacy requirement addresses a privacy risk associated with the information resource.

36. The system of claim 30, wherein the information resource is one of a website, an application, and a database.

37. The system of claim 30, wherein the information comprises personal information about an individual.

38. The system of claim 30, wherein the information comprises identifying information about an individual.

39. The system of claim 30, wherein the first collecting component further includes:
- a displaying component configured to display a user interface with at least one question about the information resource to a user; and
- a receiving component configured to receive the data about the information resource from the user via the displayed user interface.

40. The system of claim 30, wherein second collecting component further includes:
- a displaying component configured to display a user interface with at least one question about the information used by the information resource; and
- a receiving component configured to receive the data about the information used by the information resource from the user via the displayed user interface.

* * * * *